United States Patent
Di Marco et al.

(10) Patent No.: US 9,285,819 B2
(45) Date of Patent: Mar. 15, 2016

(54) CYCLICAL SUPPLY METHOD AND DEVICE, AND DETECTION DEVICE COMPRISING SAME

(75) Inventors: Stéphane Di Marco, Nanterre (FR); Laurent Pichard, Nanterre (FR); Jean-François Duhamel, Nanterre (FR)

(73) Assignee: FINSECUR, Nanterre (FR)

( * ) Notice: Subject to any disclaimer, the term of this patent is extended or adjusted under 35 U.S.C. 154(b) by 252 days.

(21) Appl. No.: 13/820,707

(22) PCT Filed: Sep. 2, 2011

(86) PCT No.: PCT/FR2011/052021
§ 371 (c)(1),
(2), (4) Date: Apr. 12, 2013

(87) PCT Pub. No.: WO2012/028833
PCT Pub. Date: Mar. 8, 2012

(65) Prior Publication Data
US 2013/0201028 A1    Aug. 8, 2013

(30) Foreign Application Priority Data

Sep. 2, 2010   (FR) ..................................... 10 56982

(51) Int. Cl.
*G08B 21/00* (2006.01)
*G05F 3/08* (2006.01)
*H02J 7/34* (2006.01)
*H02J 9/00* (2006.01)

(52) U.S. Cl.
CPC . *G05F 3/08* (2013.01); *H02J 7/345* (2013.01); *H02J 9/005* (2013.01)

(58) Field of Classification Search
CPC ..................................... G06F 1/26; G05F 1/10
USPC ................. 340/662, 628, 635, 636.1, 636.11, 340/636.12, 636.13, 636.15, 660, 663, 340/693.1, 693.3, 693.42; 328/304, 268
See application file for complete search history.

(56) References Cited

U.S. PATENT DOCUMENTS

| | | | |
|---|---|---|---|
| 4,060,709 A * | 11/1977 | Hanson ..................... | 219/130.33 |
| 5,591,212 A | 1/1997 | Keimel | |
| 5,966,078 A | 10/1999 | Tanguay | |
| 6,104,759 A | 8/2000 | Carkner et al. | |
| 6,366,072 B2 * | 4/2002 | Attimont et al. .............. | 323/349 |
| 6,525,666 B1 | 2/2003 | Shimoda | |
| 7,786,620 B2 | 8/2010 | Vuk et al. | |
| 8,077,028 B2 * | 12/2011 | Lane et al. .................... | 340/524 |
| 2003/0169022 A1 | 9/2003 | Turner et al. | |

FOREIGN PATENT DOCUMENTS

| | | |
|---|---|---|
| CN | 201153311 Y | 11/2008 |
| GB | 2401261 A | 11/2004 |

\* cited by examiner

*Primary Examiner* — Toan N Pham
(74) *Attorney, Agent, or Firm* — Im IP Law PLLC; C. Andrew Im

(57) ABSTRACT

The detection device comprises an electrical power reserve, a voltage regulator configured to regulate the voltage supplied by the electrical power reserve, at least one capacitor charged by the voltage regulator, a detection circuit powered by the capacitor and a switch. The switch is configured to deactivate the regulator when the capacitor's charge is greater than a predefined value, such that the detection circuit is then only supplied with electricity by each said capacitor. The switch can be configured to open the circuit comprising the power reserve upstream of the regulator, and the switch comprises a means of comparing the electrical charge of each capacitor with a predefined value and/or the switch comprises a transistor.

20 Claims, 8 Drawing Sheets

CYCLICAL SUPPLY METHOD AND DEVICE, AND DETECTION DEVICE COMPRISING SAME

RELATED APPLICATIONS

This application is a §371 application from PCT/FR2011/052021 filed Sep. 2, 2011, which claims priority from French Patent Application No. 1056982 filed Sep. 2, 2010, each of which is herein incorporated by reference in its entirety.

TECHNICAL FIELD OF INVENTION

This invention relates to a cyclic supply method and device, and a detection device comprising same. It applies, in particular, to the detection of a risk by an autonomous detector, i.e. not powered by the electrical network, e.g. a domestic detector of smoke, heat, gas, notably carbonic, fire or flames.

BACKGROUND OF THE INVENTION

Autonomous smoke and fire detectors should operate with no external supply of energy. Their duration of use is therefore limited by the discharge time of a battery or accumulator. This discharge time is too limited in the known detectors; this imposes maintenance methods and manipulations that are all the more complicated since the detectors are generally located high up, out of a user's direct reach. Indeed, the best location for such a detector is on the ceiling. Manipulating the detector is difficult, especially for persons with reduced mobility. Because the test button is difficult to reach many users never test their detectors, so that these are no longer in operating condition.

Increasing the number or capacity of the batteries/accumulators poses problems concerning production cost and environmental harm.

OBJECT AND SUMMARY OF THE INVENTION

This invention aims to remedy all or part of these drawbacks.

To this end, according to a first aspect this invention envisages a device for powering a cyclically operating electronic circuit, characterized in that it comprises:

- an electrical power reserve consisting of a battery or an electrical accumulator, for powering the entire electronic circuit;
- a voltage regulator configured to regulate the voltage supplied by the electrical power reserve for powering a portion of the electronic circuit;
- at least one component of the circuit being powered by the power reserve independent of the regulator;
- at least one capacitor charged by the voltage regulator and powering at least one component of the portion of the electronic circuit powered by the regulator;
- a switch configured to deactivate the regulator, such that each said component powered by the capacitor is then only supplied with electricity by a said capacitor.

Thanks to these provisions, the electrical power reserve, battery or accumulator, is only called upon to recharge each capacitor. The duration of normal operation is thus increased. The inventors have noted an increase of more than a year in the life for such a device, compared to an equivalent device without switch.

According to particular features, the power supply device comprises a circuit for detecting a physical dimension, powered by the regulator, and a sound alarm powered by the electrical power reserve at a voltage greater than the output voltage of the voltage regulator, and controlled by a component powered by the detection circuit.

The regulator's consumption can thus be reduced by avoiding having it power the sound alarm while still having a high-power sound alarm requiring a high voltage.

According to particular features, the switch is controlled by a component powered by the capacitor.

Thus, there is no need to provide a specific control circuit for the switch.

According to particular features, the electronic circuit comprises a central component that is in sleep mode while the electronic circuit is powered by the capacitor and active while the regulator is activated.

The capacitor's loss of charge is thus minimized since the central component, e.g. a microprocessor or a microcontroller, only draws its sleep-mode maintenance power from the capacitor's charge.

According to particular features, the switch is configured to cause the activation of the regulator when the capacitor supplies a voltage that doesn't allow the active operation of the central component but allows the sleep-mode operation of the central component.

The capacitor's loss of charge is thus minimized since the central component only draws its sleep-mode maintenance power from the capacitor's charge.

According to particular features, the switch is configured to cause the activation of the regulator when the capacitor supplies a voltage that doesn't allow the active operation of the central component but allows data in the central component's memory to be preserved.

The capacitor's loss of charge is thus minimized since the central component only draws its power for preserving data in memory from the capacitor's charge.

According to particular features, the power supply device comprises an electronic circuit control means that controls the operation of the electronic circuit in sleep mode when the regulator is deactivated.

The capacitor's loss of charge is thus minimized since the electronic circuit only draws its sleep-mode maintenance power from the capacitor's charge.

According to particular features, the switch comprises a MosFet-type-transistor located either in a positive power rail (channel P), or in a negative rail (channel N).

The switch thus uses very little power itself.

According to particular features, the power supply device comprises a means of comparing the voltage at the capacitor's terminals with a predefined voltage value and a means of controlling the switch, configured to activate the regulator when the voltage at the capacitor's terminals is below said predefined value.

In this way, the capacitor is only recharged when it is sufficiently discharged, which avoids recharging it prematurely.

According to particular features, the predefined voltage value is greater than the limit voltage for retaining in memory data kept by each component powered by the capacitor.

According to particular features, the power supply device comprises a means of comparing the length of time elapsed since a deactivation of the regulator with a predefined time value and a means of controlling the regulator's activation, configured to activate the regulator when said elapsed time is greater than said predefined value.

Thus, there is no need to provide voltage comparison components. Therefore only a hardware or software time measurement means ("timer") needs to be provided.

According to particular features, the predefined time value is less than the length of time for the capacitor's voltage to fall below the sleep-mode limit voltage for each component powered by the capacitor.

According to a second aspect, this invention envisages a device for detecting gas, flames, heat, smoke or fire, that comprises a power supply device that is the subject of this invention.

This detection device has the same advantages, aims and particular features as the power supply device that is the subject of the invention.

According to a second aspect, this invention envisages a method for determining an electronic circuit operating in a cycle comprising a first operational phase requiring a higher consumption than the second operational phase, comprising the rest of the cycle, characterized in that it comprises the following steps:
- provide a source of power supplying a first electrical voltage sufficient for all the electronic circuit's components;
- determine the components using, during the first phase, a second electrical voltage less than the first electrical voltage;
- provide a voltage regulator supplying an operating voltage for these components;
- power with the power source, independent of the regulator, the components requiring a voltage greater than the second electrical voltage;
- place a switch, upstream of the regulator, which is closed during at least a portion of the first phase and open during at least a portion of the second phase;
- place a capacitor, between the regulator and the circuits it powers, which is charged by the regulator when the switch is closed and which powers at least a portion of the components requiring voltage regulation and
- choose a cyclic ratio of the first phase so that the total consumption is less than the total consumption when the regulator is permanently powered by the power source, with the same cyclic ratio.

According to particular features, a cyclic ratio is chosen such that the capacitor's voltage at the end of the total consumption is greater than a limit voltage for retaining in memory the state information of at least one component powered by the capacitor and less than a sleep-mode limit voltage for said component powered by the capacitor.

As the particular characteristics, advantages and aims of this method are similar to those of the devices that are the subjects of this invention, they are not repeated here.

BRIEF DESCRIPTION OF THE DRAWINGS

Other advantages, aims and characteristics of this invention will become apparent from the description that will follow, made, as an example that is in no way limiting, with reference to the accompanying drawings, wherein.

DETAILED DESCRIPTION OF EMBODIMENTS

It must now be noted that the figures are not to scale. In addition, the curves representing signals or consumptions are represented as straight lines even when, in reality, they are curves, since only their increase, stability or decrease is required for understanding the invention.

Throughout the description, an autonomous device for detecting a risk, e.g. smoke, gas, fire, heat or flames, is described. However, the scope of this invention is not limited to this type of electronic device but extends to any electronic device operating cyclically, each cycle comprising a first operational phase requiring a higher consumption than the second operational phase, comprising the rest of the cycle. Generally the first phase relates to the awake mode operation of a component implementing a program or an algorithm and the second phase relates to this component being in sleep or standby mode, even completely stopped, without loss of stored states and data.

Figure 1:
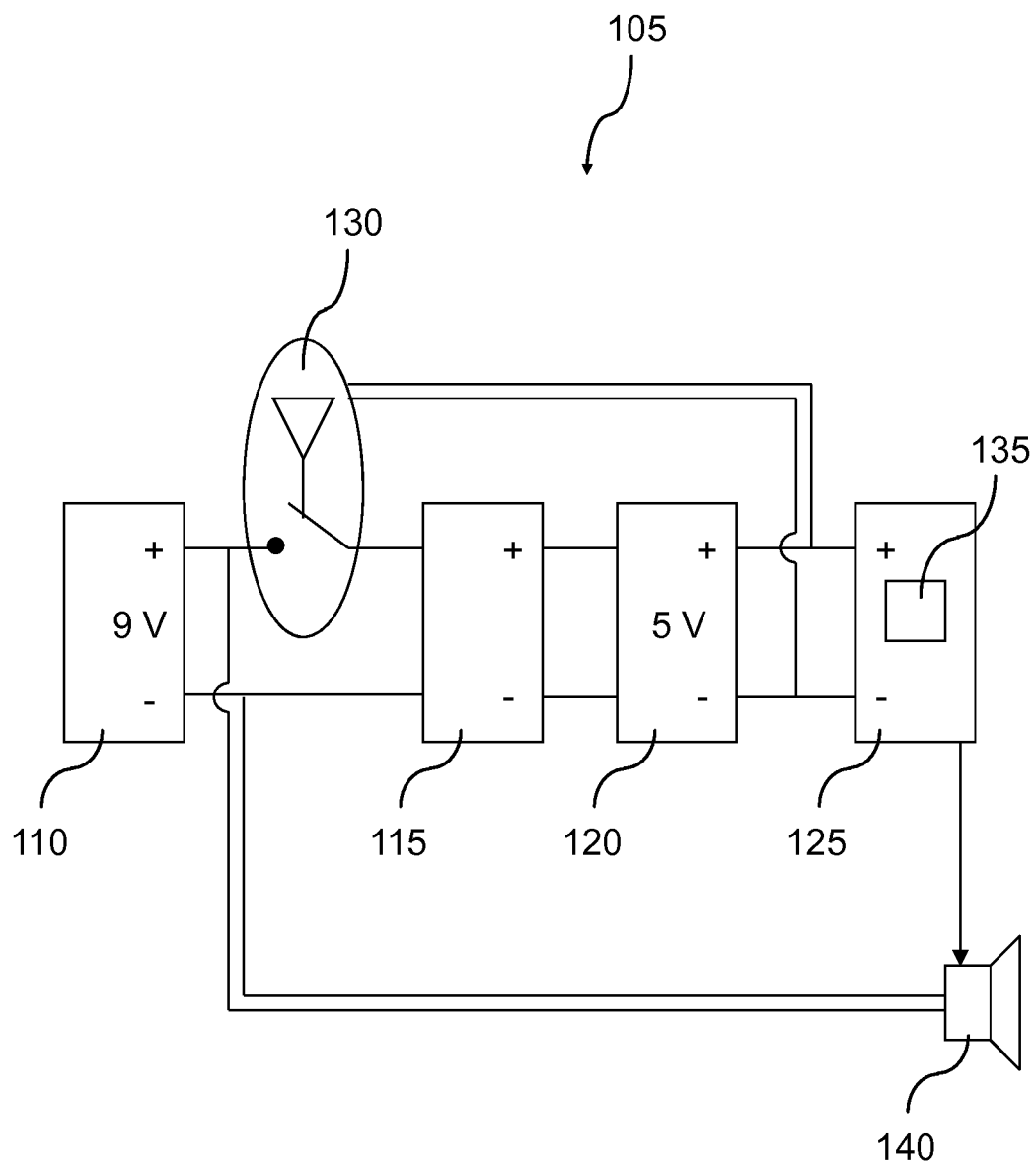
FIG. 1 represents a block-diagram of a first embodiment of a detection device that is the subject of this invention.

As shown in FIG. 1, in the first particular embodiment, the detection device 105 that is the subject of this invention comprises:
- an electrical power reserve 110;
- a voltage regulator 115 configured to regulate the voltage supplied by the electrical power reserve 110;
- at least one capacitor 120 charged by the voltage regulator 115;
- a detection circuit 125 powered by the capacitor 120 and
- a switch 130 configured to deactivate the regulator 115, such that the detection circuit 125 is then only supplied with electricity by each said capacitor 120.

The electrical power reserve 110 consists, for example, of a battery or an accumulator. The electrical power source is configured to supply voltage for the operation of an alarm 140, e.g. a siren and/or a warning light.

The voltage regulator 115, the capacitor 120 and the detection circuit 125 are of known types in the field of smoke or fire detectors. The detection circuit 125 utilizes a voltage less than the voltage supplied by the electrical power source 110. Components preventing the regulator 115 from being powered by the capacitor 120 are not shown in FIG. 1 as they are well known to the person skilled in the art.

Typically, the voltage used by the alarm 140 is greater than or equal to nine volts whereas the operating voltage of the detection circuit 125 is less than six volts.

For example, a central component 135 of the detection circuit 125 is a microcontroller or an Asic circuit (acronym for "Application Specific Integrated Circuit") operating with a voltage of three or five volts, the voltage of nine volts being required to power a sound alarm that must deliver 85 db at three meters.

The switch 130 is configured to open the circuit comprising the power reserve 110 upstream of the regulator 115. In this first embodiment, the switch 130 comprises a comparison means (represented by a triangle generally associated with an operational amplifier) for comparing the electrical charge of each capacitor 120 with a predefined limit value. This comparison means is, in embodiments, integrated into the central component 135 of the detection circuit 125. In embodiments, the switch 130 comprises a transistor (not shown), e.g. of MosFet type, therefore with low voltage loss, located either in a positive power rail (channel P), or in a negative rail (channel N).

Preferably, the central component 135 is put in sleep mode between two analyses performed by the detector 105, so as to optimize the battery's life. Typically, the active/sleep cyclic ratio is a few milliseconds for five to ten seconds in sleep mode. Preferably, the cyclic ratio is greater than 100. Even more preferably, the cyclic ratio is greater than 300. It is noted that, in the case where the detector 105 utilizes radio communications, its awake phase can last 10 ms whereas this phase is of a lower order of magnitude when there is no radio communication, for example 1 ms. The total duration of the cycle is from 3 to 6 seconds, or even 8 seconds. It is noted that the length of this cycle is reduced when the detection circuit needs to perform a removal of doubt, e.g. if a low level of gas, smoke or heat has been detected that is below a level for immediately triggering an alert.

Preferably, during the sleep period the regulator 115 is deactivated; this saves the regulator's intrinsic consumption (which is generally between 4 µA and 10 µA), which accounts for more than 80% of the total consumption (because of the extremely low value of the active/sleep cyclic ratio).

Preferably, a central component 135 is chosen that has a very low voltage for retaining in memory states and data and very rapid re-initialization with data retained in memory.

For example, a PIC16F677 from Microchip (registered trademarks) has a power range from two to 5.5 volts in active mode. However, in sleep mode it can keep the data in internal memory (Sram) through to 1.5 volts.

To implement this invention, this central component 135 is supplied with a regulated 3.3 volts, required, per se, to ensure the operation of analog/digital conversions, output sufficient voltage over the output pins to light up an indicator light, etc., and the buffer capacitor 120 is charged at this value. When the central component 135 stops, it can keep the stored data as-is in sleep mode by being powered by the buffer capacitor 120 until the voltage at this capacitor's terminals reaches 1.5 volts. At that time, the switch is closed, under the control of the comparator and switch 130, to re-charge the buffer capacitor 120 and, preferably, restart the central component 135 in active mode with the data kept in memory from one cycle to the next.

In variants, the voltage comparator takes the form of a low voltage detector internal to the central component 135.

In variants, the buffer capacitor 120 is sized such that its discharge allows the central component 135 to be powered in sleep mode throughout the sleep period (this time parameter can be parameterized in a microcontroller). In effect, this sizing is a function of the consumption in sleep mode, the minimum acceptable voltage and the duration of the sleep period (based on an adjustable watchdog). Of course, temperature conditions and value tolerances are taken into account, to prevent the voltage at the terminals of the capacitor 120 being able to go below the minimum voltage.

It is noted that the detector comprises a startup system (not shown) so that, when first powered up, the closing of the switch is controlled using hardware, not software. For example an additional capacitor is provided that maintains the switch closure control during the charging of the capacitor 120.

Figure 2:
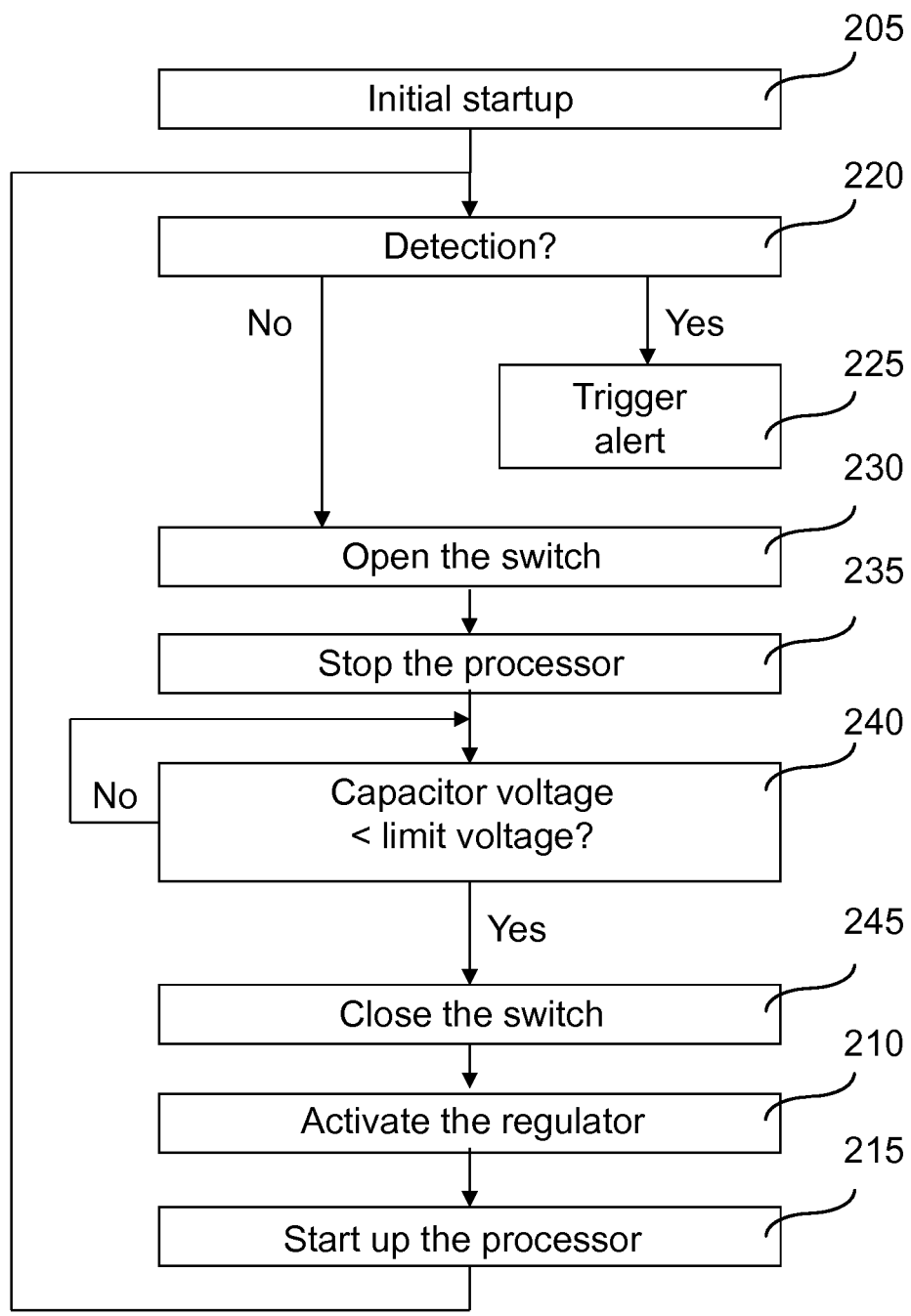
FIG. 2 represents, in the form of a logical diagram, steps utilized in a first particular embodiment of the method that is the subject of this invention, adapted to the device shown in FIG. 1.

FIG. 2 shows steps in the operation of a detection device such as that shown in FIG. 1. These steps comprise, first of all, an initial startup step 205, when the power source 110 is first powered up or changed, of closing the switch 130, activating the regulator 115 and starting up the central component 135. Then, the central component commands or carries out iteratively:

- a step 220 of determining the detection of a physical dimension representing a risk, e.g. smoke, heat, gas;
- in the event of detection, a step 225 of triggering an alert and an alarm 140;
- if there is no detection, a step 230 of opening the switch 130;
- a step 235 of stopping the central component 135 or, at least, of switching to sleep mode;
- a step 240, performed by the comparator integrated into the switch 130 or into the central component 135, of determining whether the voltage at the terminals of the capacitor 120 is less than a limit value, this limit value being chosen to be greater than the voltage at which the data stored in the central component might be altered;
- if not, step 240 is repeated;
- if yes, the comparator commands the closing of the switch 130, during a step 245;
- a step 210 of activating the regulator 115, as a result of the closing of the switch 130, which causes the capacitor 120 to be re-charged;
- a step 215 of resetting the central component 135 without erasing the data stored in memory and
- a return to step 220.

Figure 3:
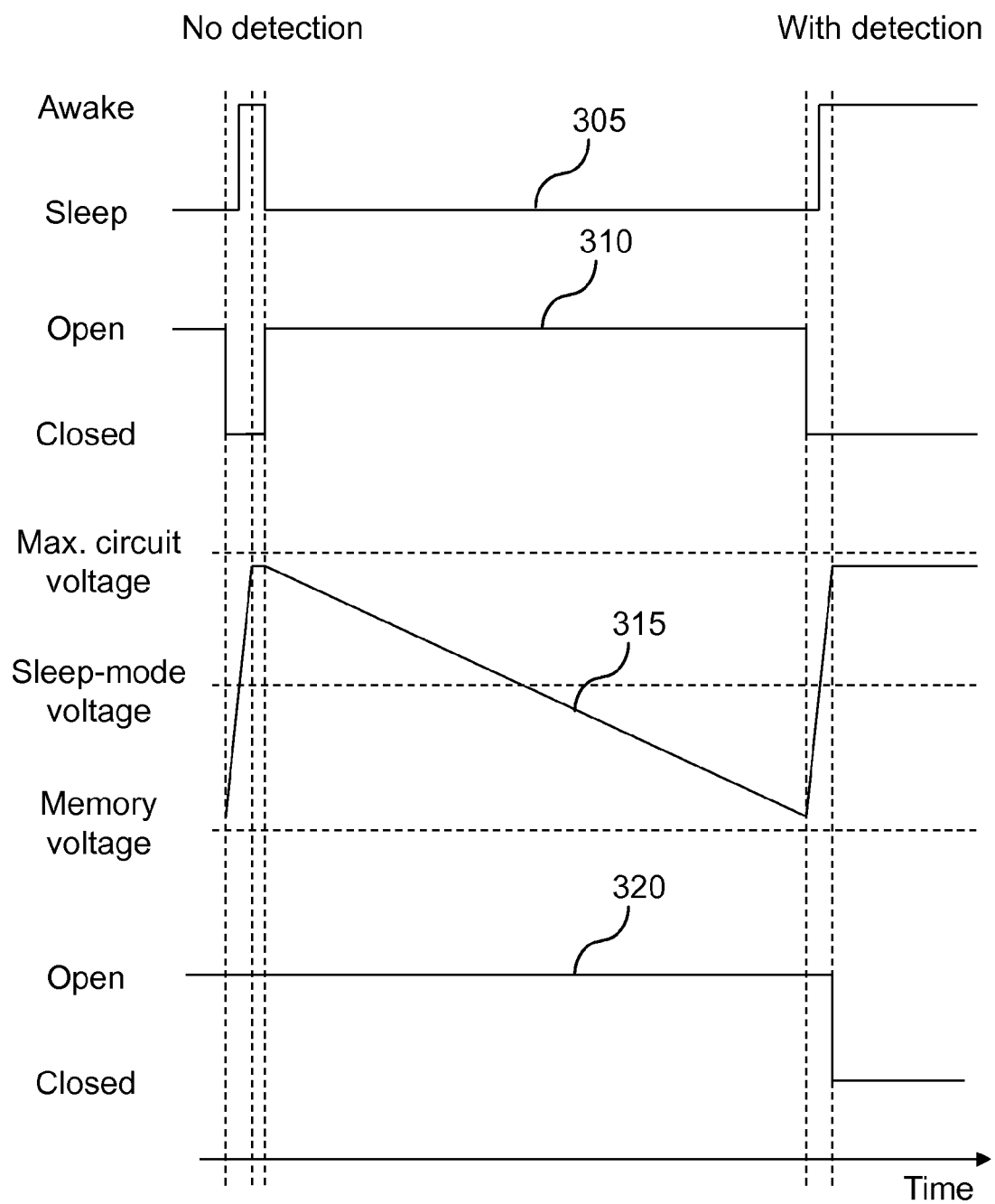
FIG. 3 represents, in the form of a time line, signals utilized by components of the device shown in FIG. 1.

FIG. 3 shows, on curve 305, the state of the central component 135, on curve 310, the state of the switch 130, on curve 315, the voltage at the terminals of the capacitor 120 and, on curve 320, the state of the switch controlling the alarm 140. In FIG. 3, the case where the central component detects no physical dimension representative of a risk is represented on the left, and the opposite case on the right.

In each cycle, if there is no detection, the central component 135 is stopped. The switch 130 is then closed, which causes the regulator 115 to be activated and, as a result, the voltage at the terminals of the capacitor 120 to be increased. When this voltage is sufficient for the awake mode of the central component 135, the central component 135 performs a reset while retrieving the data stored in memory. At the end of the detection phase, the central component 135 causes the switch 130 to be opened and stops. The capacitor 120, which powers the detection circuit 125, gradually discharges until its voltage becomes less than the limit voltage indicated in step 240. At that time, the cycle starts over.

In the event of detection, the switch 130 remains closed and the alarm 140 is triggered.

As is understood from reading the description of FIGS. 1 to 3, this first embodiment has the advantage of permitting the voltage at the terminals of the capacitor 120 to drop below the sleep-mode maintenance voltage for the central component 135 but above the data retention voltage for the central component 135. The capacitor's discharge time can thus be increased, compared to the case where the central component 135 has to remain in sleep mode. The cyclic ratio can thus be reduced since the capacitor's discharge time is increased and the general consumption is very low.

However, a voltage comparator must be provided since the central component 135 cannot cause the closing of the switch at the end of the discharging of the capacitor 120, since it does not have the voltage required for its operation, even in sleep mode.

Figure 4:
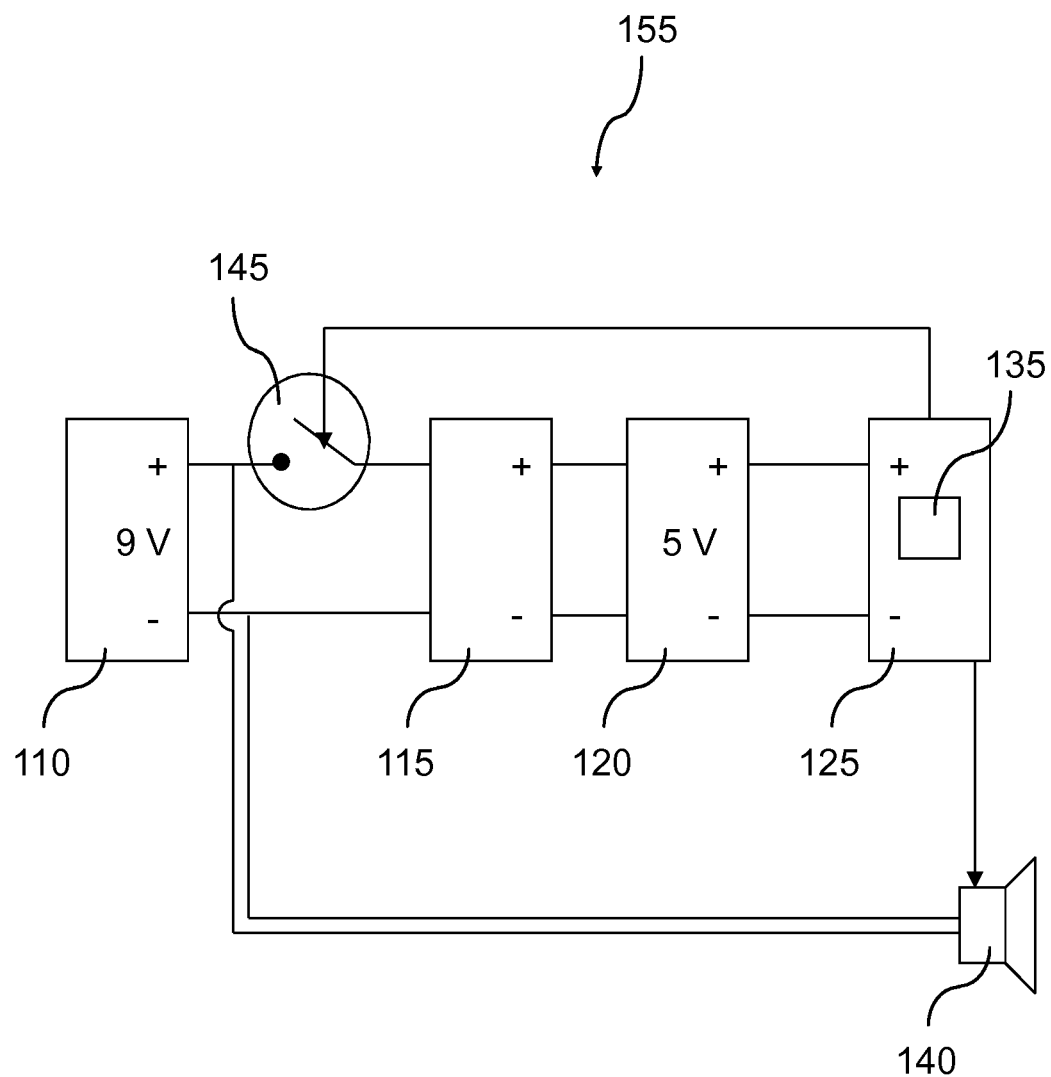
FIG. 4 represents a block-diagram of a second embodiment of a detection device that is the subject of this invention.

FIG. 4 shows that the second embodiment 155 of the detection device comprises the same components as the first embodiment shown in FIG. 1, except for the switch 145 that replaces the switch with comparator 130.

The switch 145 is configured to open the circuit comprising the power reserve 110 upstream of the regulator 115. In this second embodiment, the switch 145 does not comprise a means of comparing the electrical charge of each capacitor 120 with a predefined limit value. This comparison means is replaced by a time count ("timer") performed by the central component 135, which controls the state of the switch 145.

In embodiments, the switch 145 comprises a transistor (not shown), e.g. of MosFet type, therefore with low voltage loss, located either in a positive power rail (channel P), or in a negative rail (channel N).

Preferably, the central component 135 is put in sleep mode between two analyses performed by the detector 105, so as to optimize the battery's life. Typically, the active/sleep cyclic ratio is a few milliseconds for five to ten seconds in sleep mode. Preferably, the cyclic ratio is greater than 100. Even more preferably, the cyclic ratio is greater than 300. It is noted that, in the case where the detector 105 utilizes radio communications, its awake phase can last 10 ms whereas this phase is of a lower order of magnitude when there is no radio communication, for example 1 ms. The total duration of the cycle is from 3 to 6 seconds, or even 8 seconds. It is noted that the length of this cycle is reduced when the detection circuit needs to perform a removal of doubt, e.g. if a low level of gas, smoke or heat has been detected that is below a level for immediately triggering an alert.

Preferably, during the sleep period the regulator 115 is deactivated; this saves the regulator's intrinsic consumption (which is generally between 4 μA and 10 μA), which accounts for more than 80% of the total consumption (because of the extremely low value of the active/sleep cyclic ratio).

Preferably, a central component 135 is chosen that has a large range of sleep mode power supply voltages allowing it to be powered by a discharging capacitor.

For example, a PIC16F677 from Microchip (registered trademarks) has a power range from two to 5.5 volts in active mode.

To implement this invention, this central component 135 is supplied with a regulated 3.3 volts, required, per se, to ensure the operation of analog/digital conversions, output sufficient voltage over the output pins to light up an indicator light, etc., and the buffer capacitor 120 is charged at this value. When the central component 135 switches to sleep mode, it can be kept in sleep mode by being powered by the buffer capacitor 120 until the voltage at this capacitor's terminals reaches two volts. At that time, the switch 145 is closed, under the control of the central component 135, to re-charge the buffer capacitor 120 and operate the central component 135 in active mode.

In variants, the buffer capacitor 120 is sized such that its discharge allows the central component 135 to be powered in sleep mode throughout the sleep period (this time parameter can be parameterized in a microcontroller). In effect, this sizing is a function of the consumption in sleep mode, the minimum acceptable voltage and the duration of the sleep period (based on an adjustable watchdog). Of course, temperature conditions and value tolerances are taken into account, to prevent the voltage at the terminals of the capacitor 120 being able to go below the minimum voltage.

It is noted that the detector comprises a startup system (not shown) so that, when first powered up, the closing of the switch is controlled using hardware, not software. For example an additional capacitor is provided that maintains the switch closure control during the charging of the capacitor 120.

Figure 6:
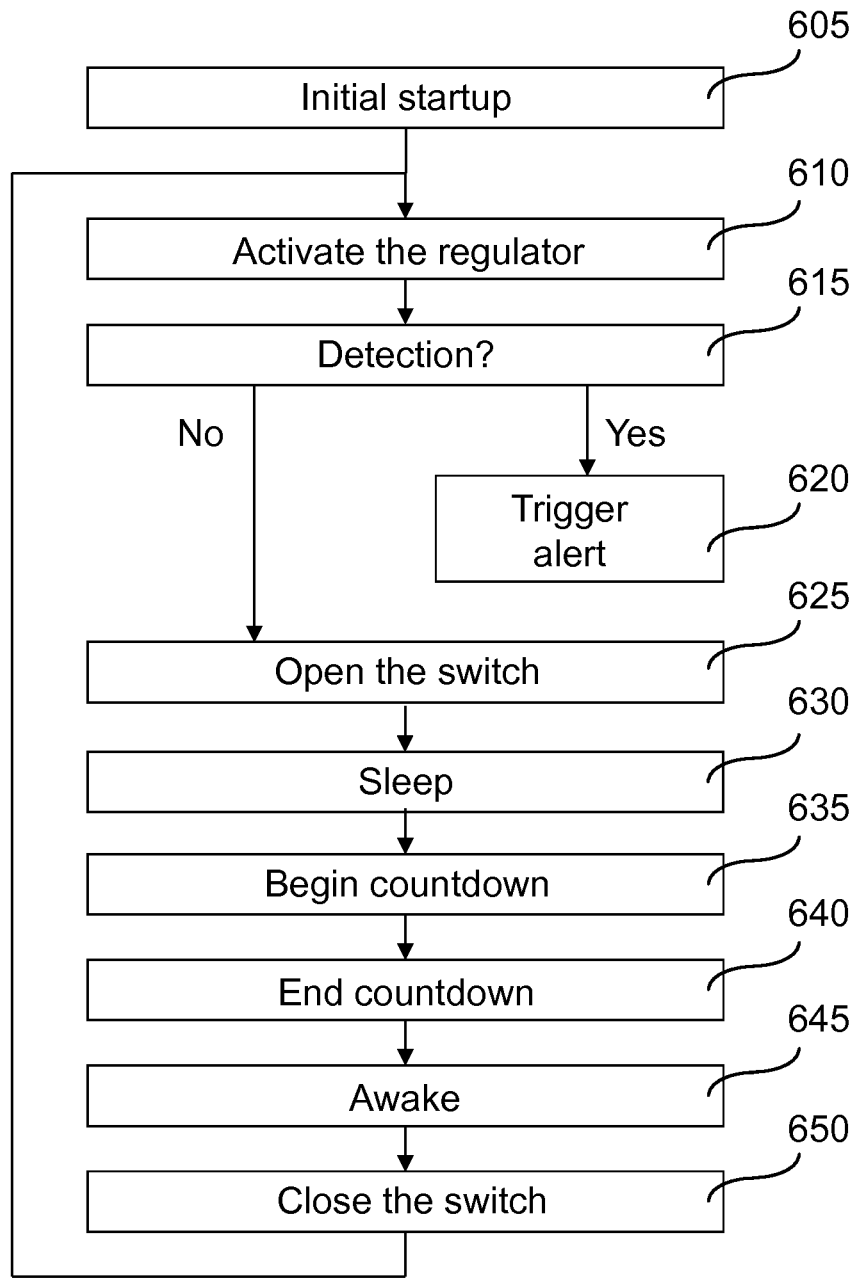
FIG. 6 represents, in the form of a logical diagram, steps utilized in a second particular embodiment of the method that is the subject of this invention, adapted to the device shown in FIG. 4.

FIG. 6 shows steps in the operation of a detection device such as that shown in FIG. 4. These steps comprise, first of all:
  an initial startup step 605, when the power source 110 is first powered up or changed, of closing the switch 145 and
  a step 610 of activating the regulator 115, as a result of the closing of the switch 145, which causes the capacitor 120 to be re-charged.

Then, the central component commands or carries out iteratively:
  a step 615 of determining the detection of a physical dimension representing a risk, e.g. smoke, heat, gas;
  in the event of detection, a step 620 of triggering an alert and an alarm 140;
  if there is no detection, a step 625 of opening the switch 145;
  a step 630 of the central component 135 switching to sleep mode;
  a step 635 of counting time until a length of time parameterized in the programming of the central component 135 is reached;
  an end of countdown step 640 when this length of time has elapsed;
  a step 645 of waking up the central component 135;
  a step of controlling the opening of the switch 145 by the central component 135;
  a return to step 610.

Figure 5:
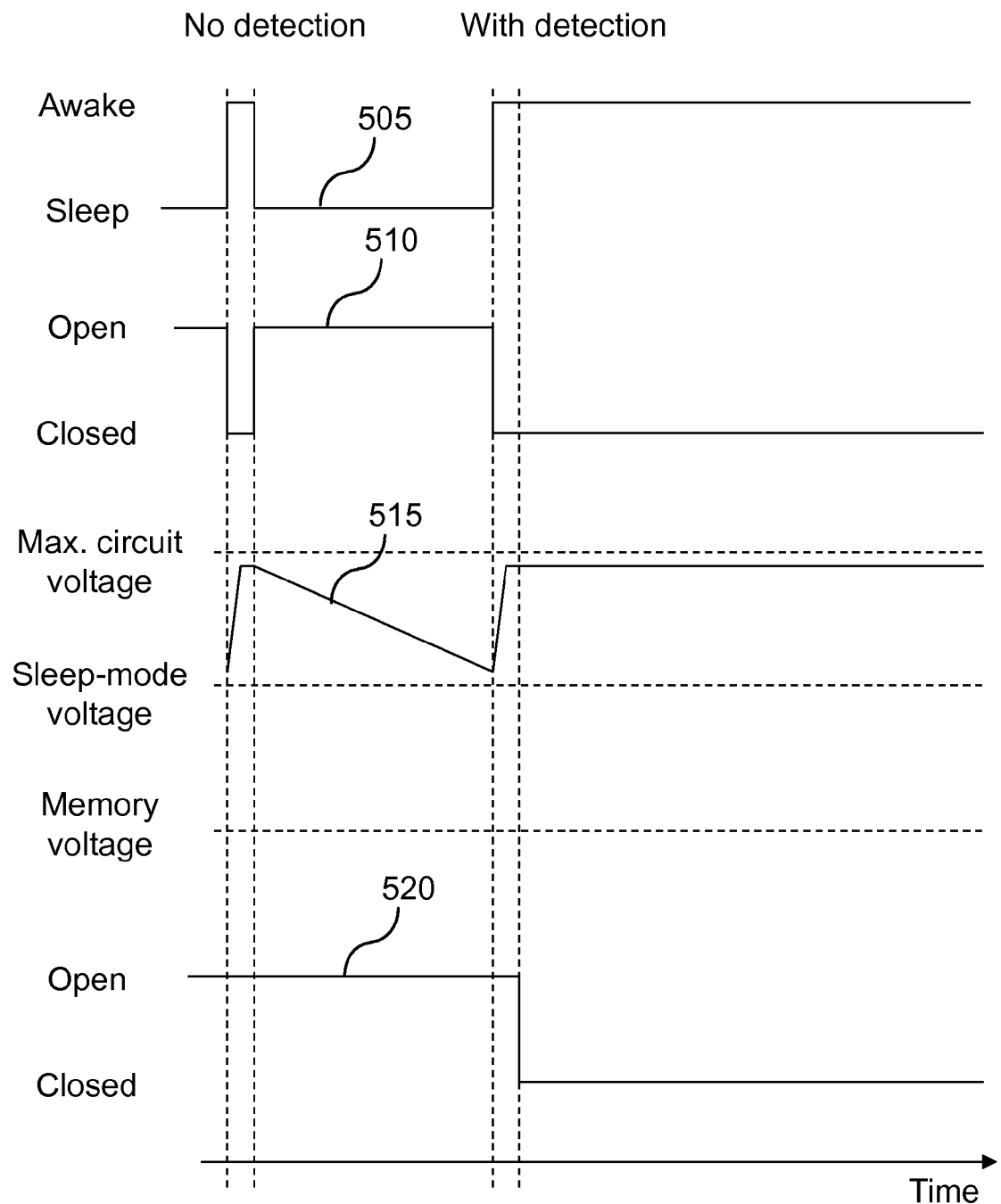
FIG. 5 represents, in the form of a time line, signals utilized by components of the device shown in FIG. 4.

FIG. 5 shows, on curve 505, the state of the central component 135, on curve 510, the state of the switch 145, on curve 515, the voltage at the terminals of the capacitor 120 and, on curve 520, the state of the switch controlling the alarm 140. In FIG. 5, the case where the central component detects no physical dimension representative of a risk is represented on the left, and the opposite case in the center.

In each cycle, if there is no detection, the central component 135 is in sleep mode. When it switches to active mode, it controls the closing of the switch 145, which causes the regulator 115 to be activated and, as a result, the voltage at the terminals of the capacitor 120 to be increased.

At the end of the detection phase, the central component 135 causes the switch 145 to be opened and switches to sleep mode. The capacitor 120, which powers the detection circuit 125, gradually discharges without dropping below the minimum sleep mode voltage for the central component 135, thanks to the sizing mentioned above. When the sleep duration of the central component 135 has elapsed, the cycle starts over.

In the event of detection, the switch 145 remains closed and the alarm 140 is triggered.

As is understood from reading the description of FIGS. 4 to 6, this second embodiment has the advantage of not requiring a comparator. However, it requires the voltage at the terminals of the capacitor to never fall below the sleep-mode limit voltage.

Figure 7:
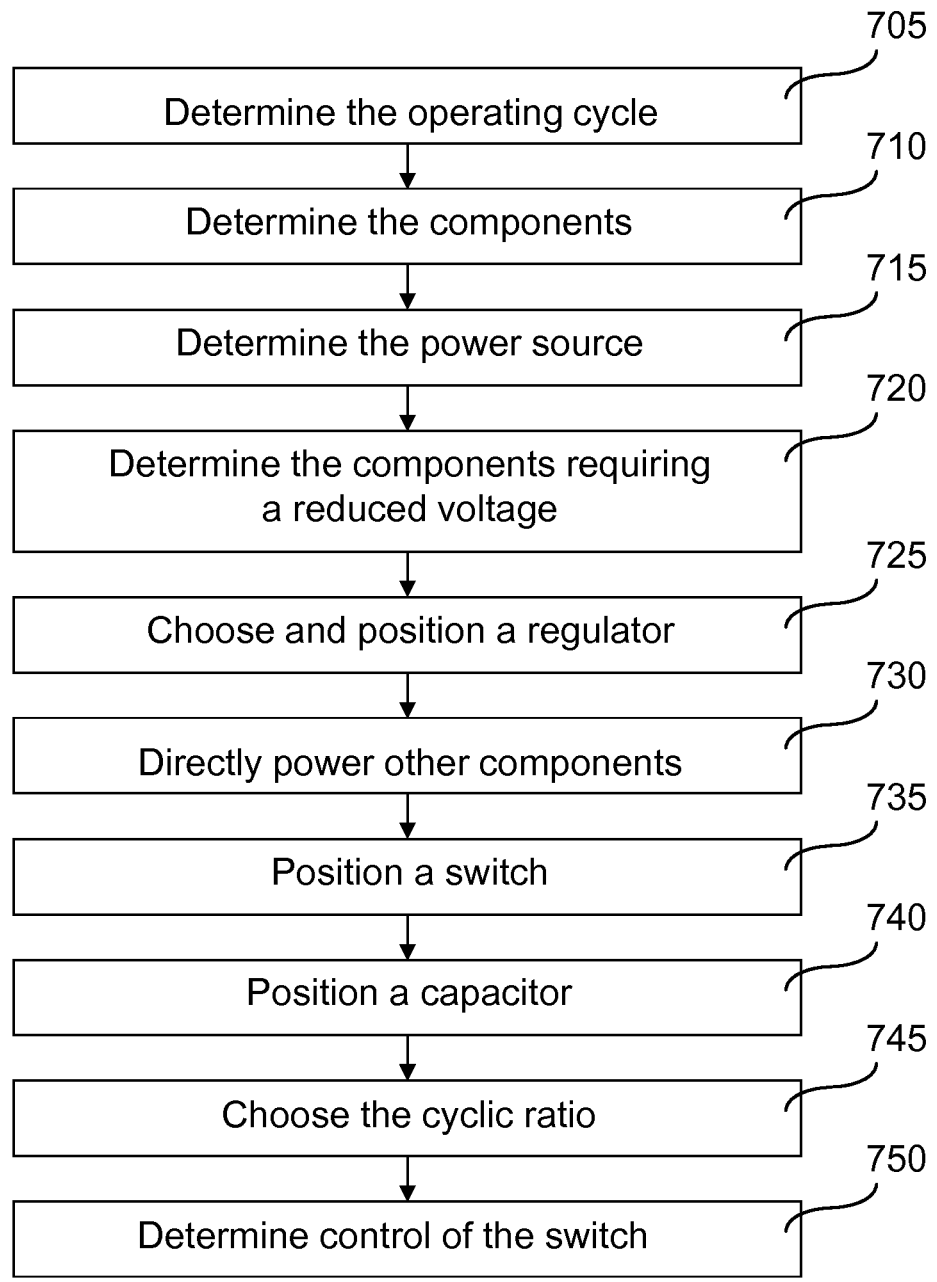
FIG. 7 represents, in the form of a logical diagram, a method for configuring a cyclically operating electronic circuit implementing the device that is the subject of the invention

To configure a low power consumption cyclically operating electronic circuit, as shown in FIG. 7, the following steps are implemented:
  a step 705 of determining the operating cycle of the circuit and its central component; this consists of determining which functions are performed during the awake phases of the central component, in a way well known to the person skilled in the art;
  a step 710 of determining the electronic circuit's components, except for its regulator, its regulator switch, its capacitor for maintaining voltage at the terminals of the central component, its power source and, possibly, its central component;

a step 715 of determining the power source; this consists of determining the voltage delivered by the power source, in particular in relation to the high-consumption components, e.g. the alarm 140;

a step 720 of determining components requiring or permitting a reduced voltage, in relation to the output voltage of the power source, e.g. the central component;

a step 725 of choosing a regulator for powering the components preferably powered by a reduced voltage; this consists of choosing a regulator having a low residual consumption but capable of powering these components;

a step 730 of directly powering other components independent of the regulator, in particular the components requiring a higher voltage than the regulator's output voltage;

a step 735 of positioning a switch upstream of the regulator so as to be able to cut its power and eliminate this residual consumption;

a step 740 of positioning a capacitor between the regulator and the components powered by the regulator, providing for the regulator not to use power stored in the capacitor;

a step 745 of choosing the cyclic ratio to, at the same time, perform the circuit's functions sufficiently frequently, reduce the total consumption and, depending on the case, maintain the central component in sleep mode or ensure the retention in the central component's memory of the data and states stored there and a step 750 of determining the way of and, possibly, the comparator, controlling the switch, depending on the cyclic ratio chosen.

It is noted that some steps can, first of all, be simulated during the design of the circuit and then optimized iteratively. Alternatively, the steps shown in FIG. 7 are performed twice, for each of the types of operation described with regard to the first (FIGS. 1 to 3) and second (FIGS. 4 to 6) embodiments.

Figure 8:
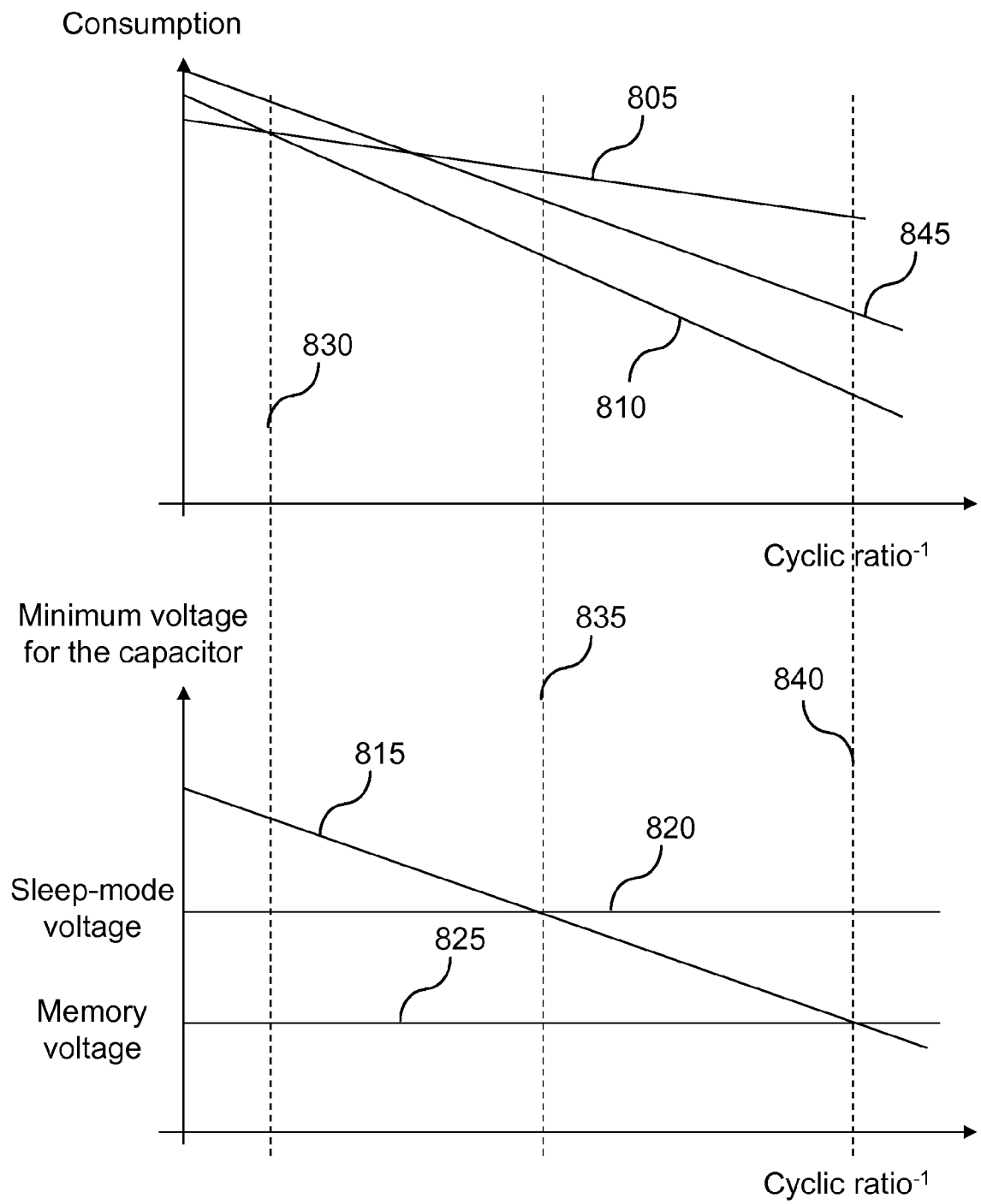
FIG. 8 represents the consumption and voltage curves as a function of the inverse of a cyclic ratio.

The top of FIG. 8 shows the electronic circuit's consumptions, as a function of the inverse of a cyclic ratio, for:

a circuit in which there is no switch activating the regulator and no capacitor maintaining the voltage upstream of the regulator: curve 805;

a circuit according to the first embodiment: curve 845 and a circuit according to the second embodiment: curve 810.

It is noted that, for a high cyclic ratio, on the left, curve 805 is below curves 810 and 845. In contrast, as the cyclic ratio increases, curve 810 gets farther below curve 845 and curve 845 gets farther below curve 805.

The bottom of FIG. 8 shows, with the same scale of inverses of the cyclic ratio, the minimum voltage 815, during the cycles, at the terminals of the capacitor maintaining the voltage for the central component, the limit value 820 for the sleep-mode maintenance voltage of the central component and the limit value 825 of the voltage for retaining in memory data kept by the central component.

From reading this Figure, it can be seen that the limit of use of the first embodiment, in terms of cyclic ratio, curve 845, corresponds to the voltage limit 825 and is located at cyclic ratio value 840. The limit of use of the second embodiment, in terms of cyclic ratio, curve 810, corresponds to the voltage limit 820 and is located at cyclic ratio value 835.

According to the cyclic ratio limit value imposed by the circuit's operation, for example because it is necessary to detect a risk in less than 10 seconds, one or other of the embodiments is chosen by comparing the consumptions represented by curves 810 and 845.

The invention claimed is:

1. A detection device comprising a power supply device for powering a cyclically operating electronic circuit, the power supply device comprising:
    an electrical power reserve comprising a battery or an electrical accumulator, to power an entire electronic circuit;
    a voltage regulator configured to regulate a voltage supplied by the electrical power reserve to power a portion of the electronic circuit;
    at least one component of the circuit being powered by the electrical power reserve independent of the voltage regulator;
    at least one capacitor charged by the voltage regulator and configured to power at least one component of the portion of the electronic circuit powered by the regulator;
    a switch configured to deactivate the voltage regulator, such that each component of the electronic circuit powered by the capacitor is only supplied with electricity from the capacitor; and
    wherein the detection device is configured to detect gas, flames, heat, smoke or fire.

2. Power supply device according to claim 1, further comprising a detection circuit to detect a physical dimension, powered by the regulator; and a sound alarm powered by the electrical power reserve at a voltage greater than an output voltage of the voltage regulator, the sound alarm being controlled by the detection circuit.

3. Power supply device according to claim 1, wherein the switch is controlled by a component powered by the capacitor.

4. Power supply device according to claim 1, wherein the electronic circuit further comprises a central component that is in a sleep mode while the electronic circuit is powered by the capacitor and in an active operation while the regulator is activated.

5. Power supply device according to claim 4, wherein the switch is configured to activate the regulator when the capacitor supplies a voltage to permit sleep mode operation of the central component but does not allow the active operation of the central component.

6. Power supply device according to claim 5, wherein the switch is configured to activate the regulator when the capacitor supplies a voltage that permits data in a memory of the central component to be preserved but does not allow the active operation of the central component.

7. Power supply device according to claim 4, wherein the switch is configured to activate the regulator when the capacitor supplies a voltage that permits data in a memory of the central component to be preserved but does not allow the active operation of the central component.

8. Power supply device according to claim 1, further comprises a controller for controlling operation of the electronic circuit in a sleep mode when the regulator is deactivated.

9. Power supply device according to claim 1, wherein the switch comprises a MOSFET-type-transistor located either in a positive power rail (channel P), or in a negative rail (channel N).

10. Power supply device according to claim 1, further comprises a comparator to compare a voltage at terminals of the capacitor with a predefined voltage value and a controller for controlling the switch, configured to activate the regulator when the voltage at the capacitor's terminals is below said predefined value.

11. Power supply device according to claim 10, wherein the predefined voltage value is greater than a limit voltage for retaining data kept in a memory by each component powered by the capacitor.

12. Power supply device according to claim 1, further comprises a comparator to compare a length of time elapsed since deactivation of the regulator with a predefined time value; and a controller to control activation of the regulator and configured to activate the regulator when the elapsed time is greater than the predefined time value.

13. Power supply device according to claim 12, wherein the predefined time value is less than a length of time for a voltage of the capacitor to fall below a sleep-mode limit voltage for each component powered by the capacitor.

14. Method for determining an electronic circuit operating in a cycle comprising a first operational phase requiring a higher consumption of power than a second operational phase, the method comprising the steps of:
- providing a power source supplying a first electrical voltage sufficient for all components of the electronic circuit;
- determining the components utilizing a second electrical voltage less than the first electrical voltage during the first operational phase;
- providing a voltage regulator supplying an operating voltage for the components requiring the second electrical voltage;
- powering with the power source, independent of the regulator, the components requiring a voltage greater than the second electrical voltage;
- placing a switch, upstream of the voltage regulator, which is closed during at least a portion of the first operational phase and open during at least a portion of the second operational phase;
- placing a capacitor, between the voltage regulator and the components powered by the regulator, the capacitor being charged by the voltage regulator when the switch is closed and the capacitor supplying power to at least a portion of the components powered by the voltage regulator; and
- selecting a cyclic ratio of the first operational phase so that a total consumption of power is less than a total consumption of power when the regulator is permanently powered by the power source, with the same cyclic ratio.

15. Method according to claim 14, further comprising the step of selecting the cyclic ratio such that a voltage of the capacitor after the total consumption of power by the electronic circuit is greater than a limit voltage for retaining a state information in memory of at least one component powered by the capacitor and less than a sleep mode limit voltage for said at least one component powered by the capacitor.

16. Power supply device for powering a cyclically operating electronic circuit, comprising:
- an electrical power reserve comprising a battery or an electrical accumulator, to power an entire electronic circuit;
- a voltage regulator configured to regulate a voltage supplied by the electrical power reserve to power a portion of the electronic circuit;
- at least one component of the circuit being powered by the electrical power reserve independent of the voltage regulator;
- at least one capacitor charged by the voltage regulator and configured to power at least one component of the portion of the electronic circuit powered by the regulator;
- a switch configured to deactivate the voltage regulator, such that each component of the electronic circuit powered by the capacitor is only supplied with electricity from the capacitor; and
- at least one of the following:
    - a comparator to compare a length of time elapsed since deactivation of the regulator with a predefined time value; and a controller to control activation of the regulator and configured to activate the regulator when the elapsed time is greater than the predefined time value; or
    - a comparator to compare a voltage at terminals of the capacitor with a predefined voltage value and a controller to control the switch, configured to activate the regulator when the voltage at the capacitor's terminals is below the predefined value.

17. Power supply device according to claim 16, further comprising a detection circuit to detect a physical dimension, powered by the regulator; and a sound alarm powered by the electrical power reserve at a voltage greater than an output voltage of the voltage regulator, the sound alarm being controlled by the detection circuit.

18. Power supply device according to claim 16, wherein the electronic circuit further comprises a central component that is in a sleep mode while the electronic circuit is powered by the capacitor and in an active operation while the regulator is activated.

19. Power supply device according to claim 18, wherein the switch is configured to activate the regulator when the capacitor supplies a voltage to permit sleep mode operation of the central component but does not allow the active operation of the central component.

20. Power supply device according to claim 19, wherein the switch is configured to activate the regulator when the capacitor supplies a voltage that permits data in a memory of the central component to be preserved but does not allow the active operation of the central component.

* * * * *